(12) United States Patent
Harris

(10) Patent No.: US 7,460,023 B1
(45) Date of Patent: Dec. 2, 2008

(54) AUTOMATIC ELECTRONIC DEVICE DETECTION

(76) Inventor: Scott C. Harris, P.O. Box 927649, San Diego, CA (US) 92192

( * ) Notice: Subject to any disclaimer, the term of this patent is extended or adjusted under 35 U.S.C. 154(b) by 0 days.

(21) Appl. No.: 11/697,407

(22) Filed: Apr. 6, 2007

Related U.S. Application Data

(63) Continuation of application No. 10/863,079, filed on Jun. 8, 2004, now Pat. No. 7,202,798, which is a continuation of application No. 10/455,853, filed on Jun. 6, 2003, now Pat. No. 6,765,492, which is a continuation of application No. 09/588,990, filed on Jun. 6, 2000, now Pat. No. 6,580,372, which is a continuation-in-part of application No. 09/439,376, filed on Nov. 15, 1999, now Pat. No. 6,222,458.

(51) Int. Cl.
G08B 21/00 (2006.01)

(52) U.S. Cl. .......... 340/686.6; 340/573.4; 382/203; 382/209; 455/411; 348/143

(58) Field of Classification Search .......... 340/573.4, 340/539.13, 988, 686.6; 455/411; 348/143, 348/148–150, 152–156, 159; 382/189, 203, 382/209
See application file for complete search history.

(56) References Cited

U.S. PATENT DOCUMENTS

| | | |
|---|---|---|
| 4,321,653 A | 3/1982 | Takahashi |
| 5,363,988 A | 11/1994 | Saxton et al. |
| 5,442,805 A | 8/1995 | Sagers et al. |
| 5,719,779 A | 2/1998 | Shuler et al. |
| 5,774,787 A | 6/1998 | Leopold et al. |
| 5,819,171 A | 10/1998 | Hoogerwerf et al. |
| 5,825,606 A | 10/1998 | Villain et al. |
| 5,851,108 A | 12/1998 | Clymer et al. |
| 5,923,572 A | 7/1999 | Pollock |
| 5,991,614 A | 11/1999 | Oura |
| 6,011,973 A | 1/2000 | Valentine et al. |
| 6,175,382 B1 * | 1/2001 | Mohr .......... 348/150 |
| 6,222,458 B1 | 4/2001 | Harris |
| 6,354,343 B1 | 3/2002 | Strnad et al. |
| 6,382,269 B1 | 5/2002 | Tatsuno |
| 6,397,054 B1 | 5/2002 | Hoirup et al. |
| 6,496,703 B1 | 12/2002 | da Silva |
| 6,580,372 B1 | 6/2003 | Harris |
| 6,580,915 B1 | 6/2003 | Kroll |
| 6,687,497 B1 * | 2/2004 | Parvulescu et al. .......... 455/420 |
| 6,697,638 B1 | 2/2004 | Larsson et al. |
| 6,765,492 B2 | 7/2004 | Harris |

OTHER PUBLICATIONS

Geek, "Daily Greek News", Friday Oct. 8, 1999, pp. 1-2.
Geek, "Cell Phone Can Ignite Gasoline?", News from Geek, pp. 1 and 2.

* cited by examiner

*Primary Examiner*—George A Bugg
*Assistant Examiner*—Samuel J Walk

(57) ABSTRACT

A system that detects cellular telephone and other electronic use within an unauthorized locations. The location can be detected by GPS or triangulation, and once detected can automatically produce certain operations.

10 Claims, 7 Drawing Sheets

AUTOMATIC ELECTRONIC DEVICE DETECTION

The present application is a continuation of U.S. patent application Ser. No. 10/863,079, filed Jun. 8, 2004 which is a continuation of U.S. application Ser. No. 10/455,853, filed Jun. 6, 2003, which is a continuation of Ser. No. 09/588,990 (U.S. Pat. No. 6,580,372), filed Jun. 6, 2000, which is a continuation in part of 09/439,376 (U.S. Pat. No. 6,222,458) filed Nov. 15, 1999.

FIELD OF INVENTION

The present invention relates to automatic detection of positions of electronic devices, e.g., radio devices, and determining if that position is unauthorized.

BACKGROUND

Concerns have recently been raised about the safety of cellular phones around combustible materials. At least one highly-publicized report has indicated that an operating cellular phone could cause an explosion at a gas station.

Defense against this issue could be difficult. Gas stations are often un-staffed, or minimally staffed. The attendants often stay within a burglary-protected area. The attendants are often not able or not motivated to adequately police whether a cellular phone or other radio transmitting device is being used.

SUMMARY

The present application teaches detecting locations of an electronic device and determining if that location is within an unauthorized location. Specific embodiments include detection by satellite positioning systems, detection by triangulation, and detection by an imager.

BRIEF DESCRIPTION OF THE DRAWINGS

These and other aspects will now be described in detail with respect to the accompanying drawings, wherein.

DETAILED DESCRIPTION

Figure 1:
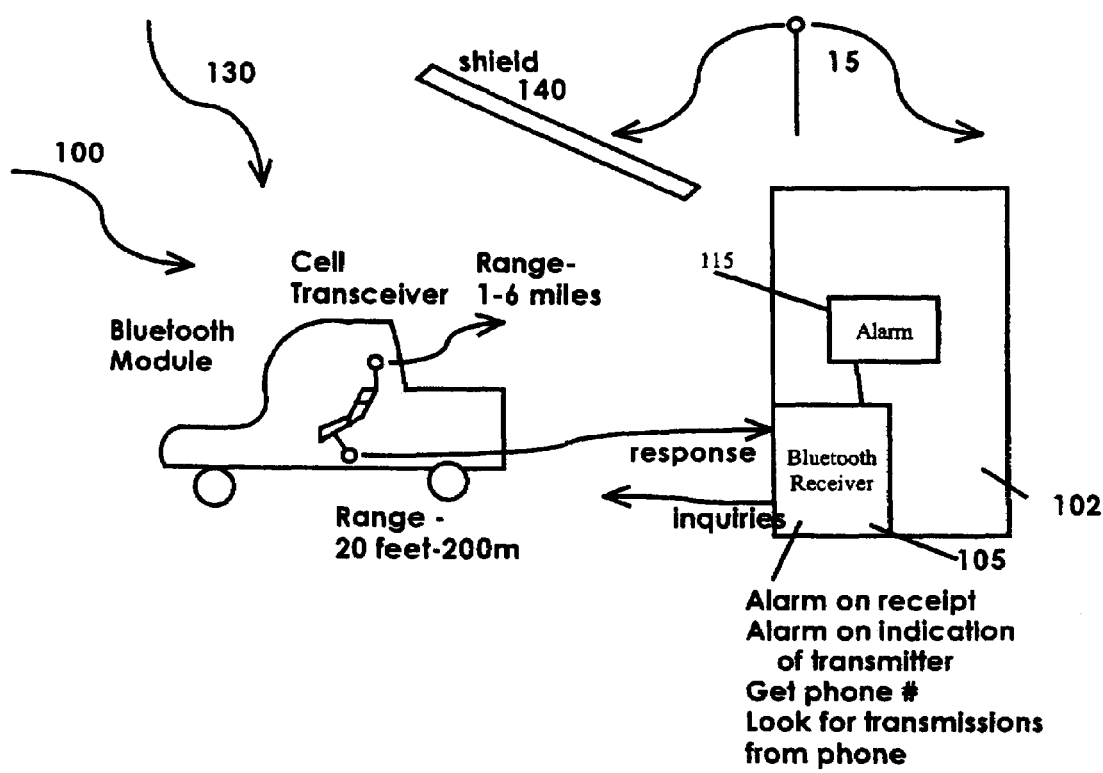
FIG. 1 shows a basic block diagram of the first embodiment which automatically detects a cellular telephone which is in use.

A first embodiment shown in FIG. 1 protects by automatic detection. In this embodiment, the cellular phone is a standard cellular telephone, e.g. IS-95, AMPS, CDMA, or GSM or other standard. The telephone also is equipped with a short range communicator, such as a Bluetooth™ transmitter. Bluetooth protocol is described in Bluetooth Specification, version 1.0, available at www.bluetooth.com. While Bluetooth is described herein as the preferred communication protocol, it should be understood that any other wireless communication protocols such as wireless LAN could be used for similar effect.

Either the entire perimeter of the gas station, or only portions of the perimeter of the gas station, can optionally be RF shielded. This helps ensure that only cellular telephones entering the gas station, and not those just passing the gas station, are detected.

In this embodiment, a central area 100, e.g. the area of the attendant station, has a Bluetooth transceiver device 105 therein. The Bluetooth transceiver 105 is preferably configured to send the messages, described herein, using Bluetooth's short range communication mode. In the short range mode, Bluetooth may transmit for a distance of, for example, 10 meters. The distance can also be adjusted, by adjusting the power output of the Bluetooth device, to avoid erroneous detection of passing cars, as compared with cars that actually enter the gas station. Another way of avoiding erroneous detection of passing cars is to require the Bluetooth acquisition to persist for, e.g. 90 seconds prior to establishing a detection.

The central transceiver 105 is continually sending Bluetooth inquiries, directed to all discoverable Bluetooth devices such as 110 within range. Each discoverable Bluetooth devices, responds to an inquiry by indicating its presence, and providing certain information such as its Bluetooth address, and its device type. The system monitors to detect a device type indicating a cellular telephone, or radio. The system can respond in different modes.

In an enhanced safety mode, all cellular telephones must actually be turned off upon entering the station. This avoids any incoming calls. An incoming call could actuate the phone ringer, causing the phone to ring and possibly causing the user to answer. Any detection of an active cellular telephone causes an alarm. The alarm is displayed as 115 in the central Bluetooth unit. This alarm can stop delivery of all fuel until the alarm is quashed. The termination of fuel delivery can be done automatically in response to a detection of an operating cellular phone, or can be manually effected by an attendant upon detecting the alarm.

In one mode, the system displays "pump stopped because of active cell phone device" on the gas pump(s). This prompts the owner of the cell phone to turn off the cell phone. After the cell phone is turned off, subsequent Bluetooth inquiries are negative, and gas pumping can be re-enabled.

Some Bluetooth phones may support automatic shutoff by Bluetooth, and if so, an automatic shutoff command may be sent.

In another mode, after receiving the indication of a Bluetooth device 120, the central Bluetooth transceiver 105 sends a page to the discovered Bluetooth device 120. The Bluetooth device 120 responds to the page, thereby establishing communications. At that point, the central device 105 can ask the Bluetooth device 120, e.g. cell phone, for certain status information. This can include an inquiry of whether the cell phone is transmitting or on a call. If the cell phone answers "yes" at that point, an alarm can be established. The alarm which can be handled as described above.

As a modification to the previously described embodiment, the paging channel can be maintained active until the cell phone 120 is turned off, at which time pumping can be resumed.

The above embodiment describes using Bluetooth, which is an intelligent wireless protocol that has addressed signals and responses to those addressed signals. Other intelligent wireless protocols can be used. It is also possible, however, to simply passively detect signals. The effectiveness of this system can be increased when coupled with a partial or complete radio shield around the station, as described herein.

At least a part of the perimeter of the gas station can be shielded. This shield 140 can be located in areas to block transmission from cellular repeaters 150. Another alternative is the shield can be formed from a plurality of separated shield parts form a shielding effect between the wires. The wires are located in areas where the autos need not enter or leave the station. The areas 130 where the autos enter and leave the station can be attenuated by the shielding effect of the wires. In this case, the wires are used to model a shielding effect along a plane of shielding. Alternatively, partial shielding can be used. When the automobile enters the gas station, it comes within at least partly the shielded area. The cell phone detection unit 102 scans the area for the presence of RF emissions of the type that would be emitted by the cellular radio portion, e.g., the local oscillator of a cellular phone. Upon detection of these emissions, an alarm is established. The alarm handling routine can proceed as described above.

In the first mode discussed above, any addressed system of communication can be used. In the second mode, any passive means of communication can be used. The detection of local oscillators is well known and is used, for example, for detecting unauthorized television reception in pay cable systems.

Another embodiment is also passive. Dangers from the cell phone is caused by RF communication. This embodiment prevents RF communication within the area of the gas station. This embodiment prevents all form of cell phone communication from occurring within the protected area. The embodiment shown in FIG. 2 uses an at least partly shielded area 200, with a roof 205 over the protected area. The roof is RF shielded, i.e., covered by copper mesh. Other shielding elements 210, 215 can be located in a predetermined pattern to provide RF shielding at predetermined areas inside the station. This effectively forms an RF shield that prevents most or all RF from the entering the station. By so doing, cell phone communication is at least significantly attenuated. Even if the user has their cell phone on, they will not be able to make or receive calls. If the user is on a call, the call will be terminated when they enter the RF protected area. The user may still have their cell phone on inside the station but the cell phone will be in a very low power, or "standby", consumption mode. Only the receive local oscillator will be operating. The phone is unable to receive a ring tone and unable to place a call.

Figure 2:
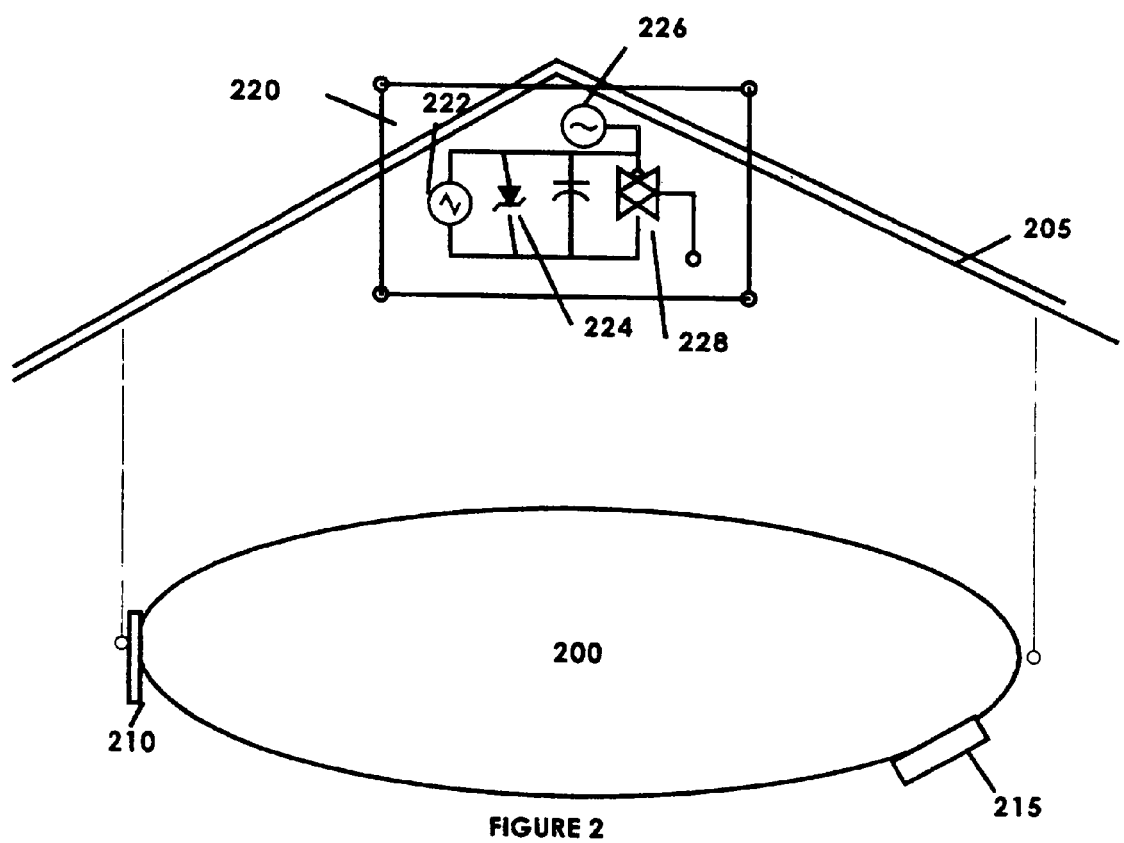
FIG. 2 shows a shielding embodiment.

Yet another modification of the FIG. 2 embodiment includes a short-range jammer 220 within the protected area 200. If a jammer is used, the shielding can be less complete. The jammer is placed close to the shield, e.g., under the shielded roof as shown.

The jammer operates by sweeping across all the cellular phone frequencies of interest. For example, a triangle wave generator 222 can be used to drive a varactor diode 224 configured as a tuner part, to sweep across all the frequencies. The jammer is driven by white or pink noise from noise generator 226. RF transmitter 228 transmits white or pink noise across the entire frequency band over which cellular phones transmit and receive.

The jammer preferably operates at a restricted power for two reasons. First, the power should be low enough so that the jamming effect does not extend outside the protected region. The power level can be adjustable, so that the total power output can be adjusted to jam within the desired area, and not jam outside the desired area. By so doing, cell phone traffic and communications are interrupted.

Second, the power may need to be low enough to avoid violating FCC or other comparable regulation.

This can be used by itself, with a partial RF shield, or with an improved RF shield. Even with an imperfect RF shield, the cell phone jammer could be useful since it could prevent cell phone communications.

In particular, this system could prevent incoming calls, preventing one of the concerns at a gas station—the incoming ring signal. Also, while communications might be possible, the call would likely be noisy and/or easily dropped, thereby frustrating the user.

Another embodiment of the above extends these teachings described above to use in other areas besides stations for delivery of combustible material. For example, the system described in the second embodiment would have special application in areas where cell phones are found by others to be annoying. This includes hospital emergency rooms, museums, houses of worship, and other such areas where cellular phones and pagers are though to be inappropriate.

Other modifications are contemplated. For example, while the present application has described the combustible material being gasoline, it should be understood that other combustible materials, such as propane, could also be protected in similar ways.

Figure 3:
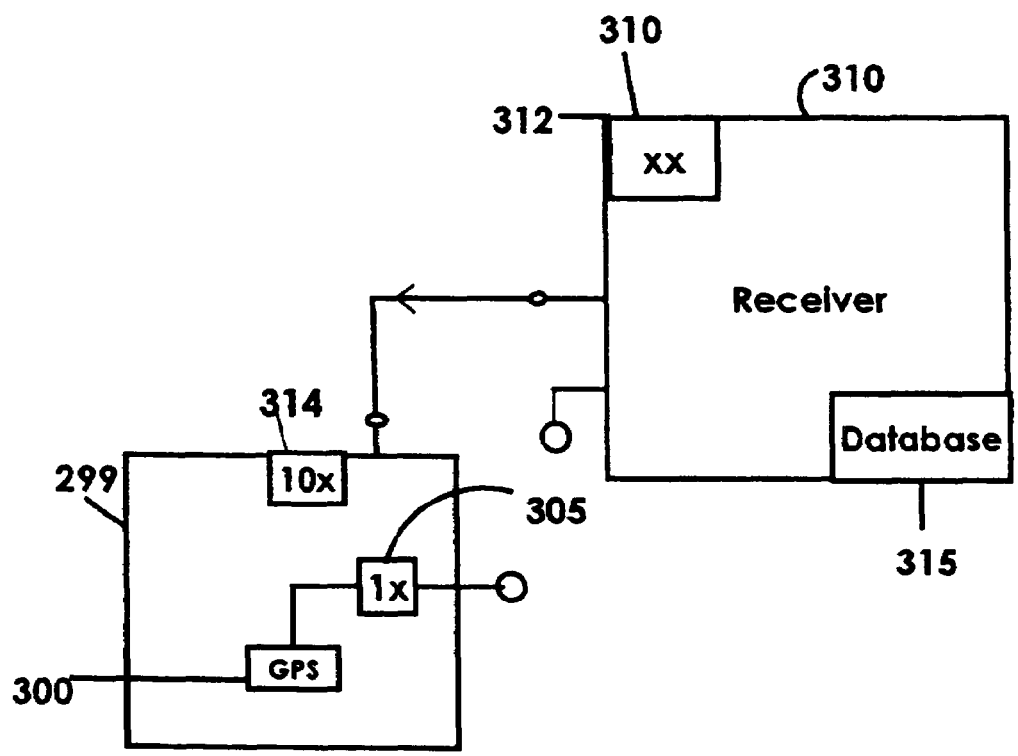
FIG. 3 shows a satellite positioning system embodiment.

Another embodiment is shown in FIG. 3. The portable telephone may be equipped with a satellite positioning system device, e.g. a global positioning system ("GPS") 300. When so equipped, the location of the portable telephone 299 can be detected. The portable telephone 299 uses the GPS signals to determine a present location, and can transmit information indicating the current coordinates using a transmitter 305. Transmitter 305 can be an existing item, e.g., the RF transmitter used for cellular communication, or a Bluetooth device.

Receiver 310 receives the coordinate information signal, which can be raw GPS information, or processed information. Receiver 310 is associated with a computer 312 that has a database 315. The database stores information indicating hot zones. The hot zones represent areas where cell phone use, or other electronic device use, is not allowed. Exemplary hot zones can include gas stations, hospital emergency rooms, airplanes and other locations where cell phone use may be prohibited. The database 315 may include one or many sets of coordinates.

Figure 4:
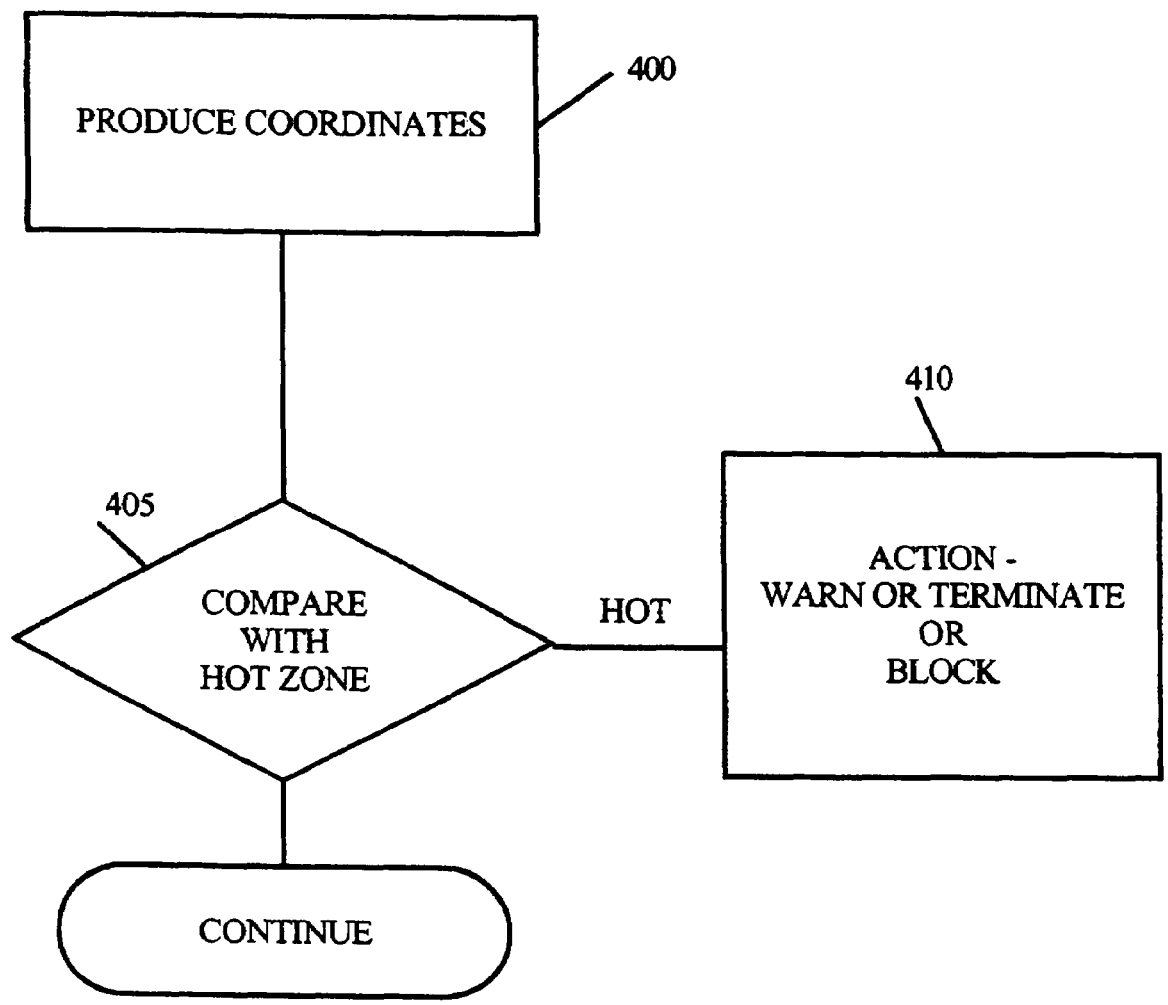
FIG. 4 shows a flowchart of operation of the satellite positioning system.

Operation is shown in the flowchart of FIG. 4.

Whenever the electronic device, here a cell phone, is in use, it may produce outputs indicating its GPS location at 400. Those values are compared with the hot zone location or locations stored in the database at 405. When that output is detected to be in the hot zone, action may be taken. The action may include warning the user, terminating the call, blocking the call or any of the other actions described above, at 410. This warning can be a beep or message displayed in the ear of the handset, via transmitter 312 sending to a receiver 314 of the cell phone, e.g. the RF receiver or a Bluetooth device. The detection can also shut off the telephone via a control signal. For example, Bluetooth™ supports such an automatic control signal. The detection of location can be done in a central office, or in the gas station itself. For example, each gas station could monitor these GPS coordinates, and look for its own coordinates as the hot zone.

Previous systems that prevented cell phone use in specified locations had the conceivable drawback of preventing use of the cell phones in a case of a true emergency. An advantage of this system is that the detection is done intelligently. Therefore, the system can be used to prevent certain calls but not prevent others. For example, this system may enable all calls to specified emergency numbers, e.g., calls to 911, and blocking or alarm of other calls.

A disclosed mode is used specifically in a gas station. The above embodiment has described using GPS to automatically detect the location of a cellular telephone. GPS may be built into these telephones in order to facilitate use in an emergency. This detection can also be used to detect some other electronic device, such as a PDA or any other electronic device that has GPS or any other automatic position location detection system built in.

Figure 5:
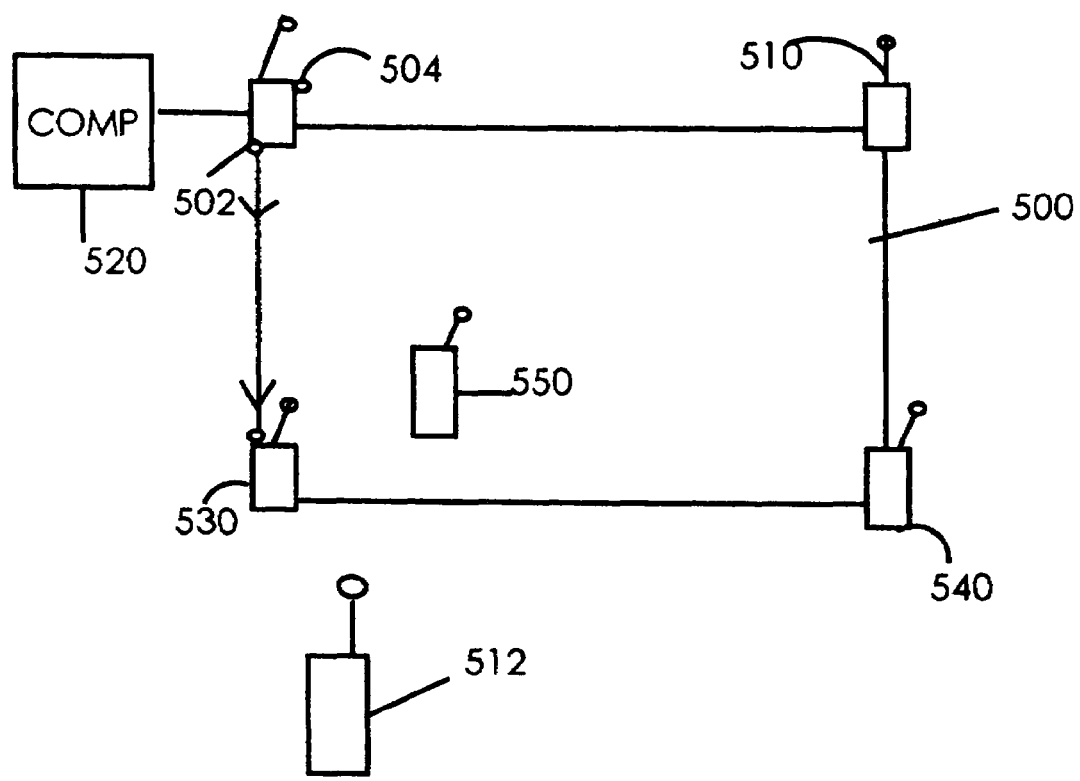
FIG. 5 shows a triangulation embodiment.

Another embodiment shown in FIG. 5 uses an alternative system to automatically detect a position of a portable telephone within an undesired zone. This system provides multiple low power receivers located near perimeters of the zone. Each of the receivers detects transmission from cell phones or other electronic devices. These systems then use triangulation to determine the position of the cell phone. For example, FIG. 5 shows four nodes, 501, 510, 530 and 540. Each of the node 500 includes wireless communication capability, shown as 502, 504, to communicate with the other nodes and receive information therefrom and send information thereto. Node 501 receives all the information and sends it to processing computer 520. Each of these nodes receives a signal from portable telephones or electronic devices 550, 552 when the devices are transmitting. Each of these nodes determines a phase-shift or delay amount in the signal from this using conventional triangulation techniques. A distance to the signal source 550, 552 can be determined.

If the portable phone is in the position 552, which is an authorized position, then the distance to the two nodes 500, 510 will be longer than the distance to the two antennas 530, 540. This indicates that the cell phone is outside the perimeter location, and hence it use is authorized.

In contrast, if the distance to all of the antennas is approximately the same, or within thirty percent of one another, then the portable phone 550 is within the perimeter and unauthorized for use. Actions can be taken as described above, to warn or terminate the unauthorized use can then be carried out. As in the above embodiments, if the termination of use is carried out in the central office, it can allow call to specified numbers, such as emergency numbers.

Figure 6:
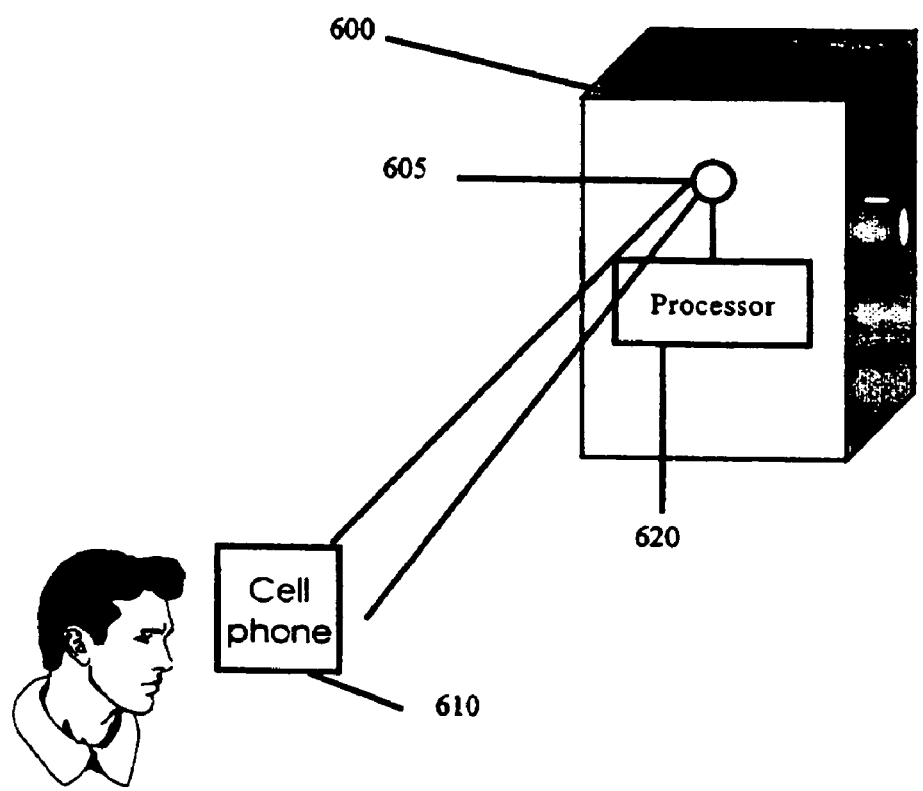
FIG. 6 shows a camera embodiment.

Another operation is shown in FIG. 6. A miniature camera 605 is associated with the pump for delivery of combustible materials, here gas pump 600. This camera takes real time images of the users such as 610 who stand in front of the gas pump 600. The device may use a very wide angle lens such as the peephole type, used to see users through doors. This obtains an image of each user 610 who is standing at each gas pump 600. The image is coupled to a processor 620.

In one embodiment, these images can simply be relayed back to the attendant who can view these users, e.g. on a multiple screen display, and manually turn off the pump or warn, upon seeing a user using a cell phone.

Figure 7:
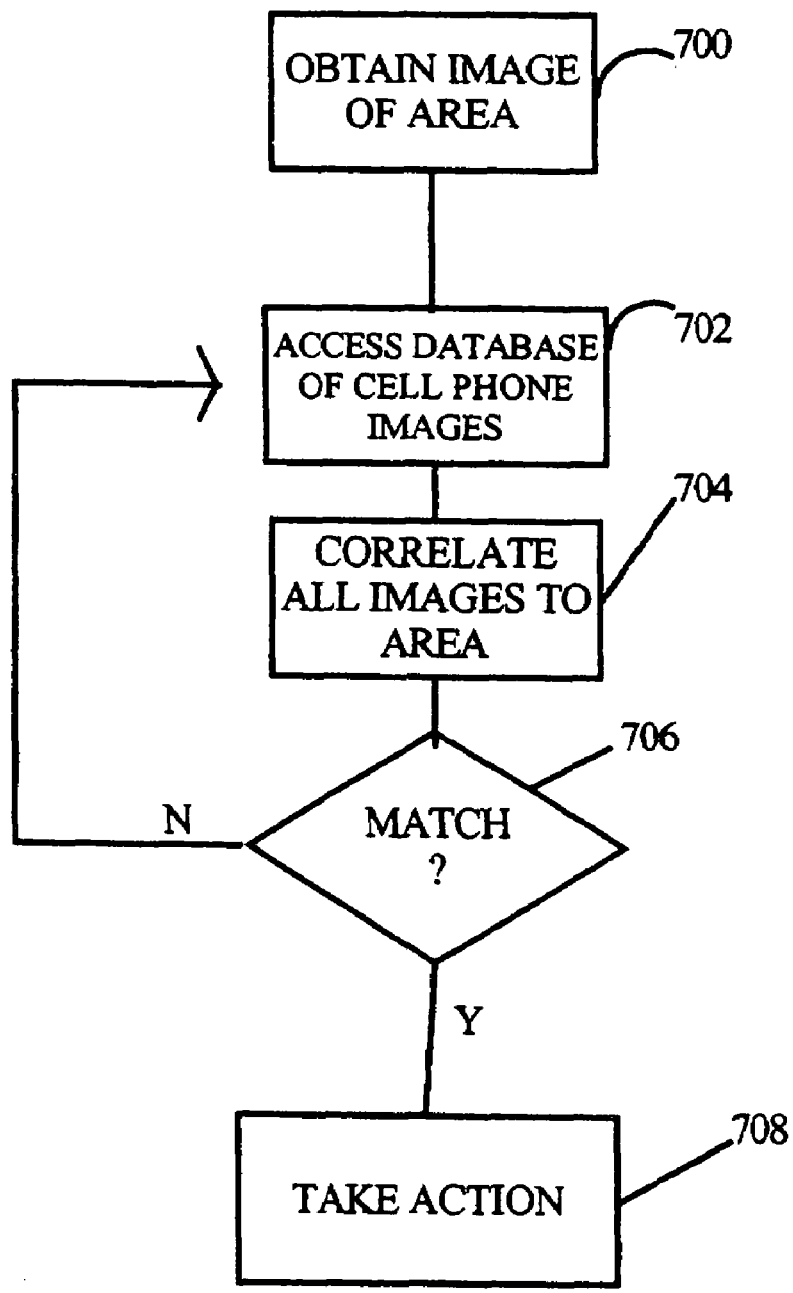
FIG. 7 shows a flowchart of operation of the camera embodiment when used in its automatic mode.

In another embodiment, the processor uses machine vision techniques to automatically recognize portable telephone use. The image from camera 605 is coupled to processor 620, which carries out the flowchart at FIG. 7. An image is obtained at 700. There are typically less than 100 different kinds of cellular telephones available on the market. The outline and shape of each of these cellular telephones can be stored within the image memory in a database. This database is accessed at 702. The image obtained through the lens is correlated across the entire image at 704. When the image matches a known cellular telephone image, a match is detected at 706. This can cause an action to be taken at 708, e.g., either cause an automatic alarm, or produce a signal to the attendant, who then verifies whether the cellular telephone is really being used. The attendant can take actions as noted above.

The FIGS. 3-7 embodiments have described use at gas pumps. However, these systems are also usable in any place where cellular telephone or other electronic device use is restricted. This can include use in airplanes, hospitals, and in certain other places. In any of these locations, the use of a cellular telephone or other type device can be automatically detected. Some action can be automatically taken.

Other modifications are contemplated. For example, while the present application has described the combustible material being gasoline, it should be understood that other combustible materials, such as propane, could also be protected in similar ways. Other electronic devices, besides portable telephones can be detected, including other two way radios, and other electronic devices.

What is claimed is:

1. A system comprising:
   a combustible material pump, having a first portion that allows dispensing combustible material;
   a camera, associated with said combustible material pump, and having a lens of a type that enables imaging a user who is standing within range of the combustible material pump; and
   a connection to a security part, that sends an image obtained by said camera to said security part, wherein said connection includes a connection to a processor that automatically detects use of a communication device at the combustible material pump, wherein said processor looks for known cellular telephone images, and matches items in said image to said known cellular telephone images.

2. A system as in claim 1, wherein said combustible material pump is a gasoline pump.

3. A system as in claim 1, wherein said connection sends the image to an attendant to individually view said images.

4. A system as in claim 3, wherein the attendant also includes the ability to disable the combustible material pump.

5. A system as in claim 1, further comprising storing a database of a plurality of known cellular telephone images, and comparing said known cellular telephone images with images within a field of view of said camera.

6. A method comprising:
   associating a camera with a device for dispensing combustible material, the camera having a lens, and the lens being sufficiently wide angle to enable obtaining images of users who are within the field of view of the dispensing device; and
   sending the image to a security part, that carries out at least one function related to security associated with the dispensing device wherein said sending comprises sending the image to a processor that automatically processes the image to determine security aspects thereof, wherein said processor automatically processes the image to find images of cellular telephones therein.

7. A method as in claim 6, wherein said security device includes sending the image to an attendant who also includes the ability to manually turn off the pump.

8. A method as in claim 6, wherein the dispensing device is a device for dispensing gasoline.

9. A method as in claim 6, further comprising storing images of a plurality of known cellular telephones, wherein said automatically processes comprises comparing said images of known cell phones with images from said camera.

10. A method as in claim 6, wherein said the dispensing device is a device for dispensing propane.

* * * * *